United States Patent
Eisendle et al.

(10) Patent No.: US 12,425,069 B2
(45) Date of Patent: Sep. 23, 2025

(54) METHOD FOR MANAGING UWB COMMUNICATION SESSIONS

(71) Applicant: NXP B.V., Eindhoven (NL)

(72) Inventors: Christian Eisendle, Graz (AT); Srivathsa Masthi Parthasarathi, Bangalore (IN); Michael Stark, Gleisdorf (AT)

(73) Assignee: NXP B.V., Eindhoven (NL)

( * ) Notice: Subject to any disclaimer, the term of this patent is extended or adjusted under 35 U.S.C. 154(b) by 99 days.

(21) Appl. No.: 18/485,417

(22) Filed: Oct. 12, 2023

(65) Prior Publication Data

US 2024/0154643 A1 May 9, 2024

(30) Foreign Application Priority Data

Nov. 9, 2022 (IN) .............................. 202211063987

(51) Int. Cl.
*H04B 1/7183* (2011.01)
(52) U.S. Cl.
CPC .................................. *H04B 1/7183* (2013.01)
(58) Field of Classification Search
CPC ......................... H04B 1/7183; H04W 56/0015; H04W 80/10; H04W 36/0011
See application file for complete search history.

(56) References Cited

U.S. PATENT DOCUMENTS

| | | |
|---|---|---|
| 2007/0054680 A1 | 3/2007 | Mo et al. |
| 2015/0200706 A1 | 7/2015 | Bottazzi et al. |
| 2020/0287590 A1* | 9/2020 | Torborg ............... H04B 1/7183 |
| 2021/0076163 A1 | 3/2021 | Burowski et al. |
| 2021/0112548 A1* | 4/2021 | de Perthuis ........... G01S 13/765 |
| 2021/0400441 A1 | 12/2021 | Burowski et al. |
| 2022/0139133 A1 | 5/2022 | Schober et al. |
| 2023/0065013 A1 | 3/2023 | Kim et al. |
| 2023/0170933 A1* | 6/2023 | Lee ..................... G01S 13/0209 375/130 |
| 2023/0276403 A1* | 8/2023 | Reddy ................. H04L 5/0048 455/456.1 |
| 2023/0328783 A1* | 10/2023 | Tian ........................ H04W 4/80 |
| 2024/0259764 A1* | 8/2024 | Barton ................. H04B 1/7163 |
| 2025/0035770 A1* | 1/2025 | Pakrooh ............. H04B 1/71635 |

OTHER PUBLICATIONS

Jones, Elden F.; "Scheduling 101—the basic of best practices"; Paper presented at PMI® Global Congress 2009; Orlando, Florida, Oct. 13, 2009; Newtown Square, PA: Project Management Institute; retrieved from the Internet: https://www.pmi.org/learning/library/schedule-101-basic-best-practices-6701.

Liu, Kuang-Hao et al.; "Exclusive-Region Based Scheduling Algorithms for UWB WPAN"; IEEE Transactions on Wireless Communications, vol. 7, No. 3; Mar. 2008.

Xiaomao, Chen et al., "Improved master-slave time synchronization algorithm based on TDOA positioning"; EITCE 2020: 2020 4th International Conference on Electronic Information Technology and Computer Engineering; Nov. 6-8, 2020, Xiamen, China; DOI: 10.1145/3443467.3443755.

* cited by examiner

*Primary Examiner* — Dac V Ha (57) ABSTRACT

A method is provided for managing ultra-wideband (UWB) sessions. In the method a first UWB communication session is performed. A process of the first UWB communication session is synchronized with a time base of a first UWB communication device. At least another UWB communication session is performed. A process of the at least another UWB communication session is synchronized to the first UWB communication session.

14 Claims, 10 Drawing Sheets

METHOD FOR MANAGING UWB COMMUNICATION SESSIONS

CROSS-REFERENCE TO RELATED APPLICATIONS

This application claims the priority under 35 U.S.C. § 119 of India patent application No. 202211063987, filed on 9 Nov. 2022, the contents of which are incorporated by reference herein.

TECHNICAL FIELD

The present disclosure relates to the technical field of Ultra-wideband (UWB) communication units. In particular, the present disclosure relates to a method for managing UWB communication sessions. Furthermore, the present disclosure relates to a UWB communication unit. Furthermore, the present disclosure relates to a computer implemented method for carrying out the proposed method.

BACKGROUND

Ultra-wideband (UWB) is a technology that uses a high signal bandwidth, in particular for transmitting digital data over a wide spectrum of frequency bands with very low power. For example, ultra-wide band technology may use the frequency spectrum of 3.1 to 10.6 GHz and may feature a high-frequency bandwidth of more than 500 MHz and very short pulse signals, resulting in high data rates. The UWB technology enables a high data throughput for communication devices and a high precision for the localization of devices.

US 2022/0070613 A1 discloses prioritized scheduling for UWB ranging with techniques for scheduling UWB-anchors and mobile devices for client ranging. A control device can be configured to determine a respective UWB ranging priority for each of a plurality of mobile devices.

US 2015/0200706 A1 discloses synchronization of a real-time UWB location system.

SUMMARY

According to a first aspect of the present disclosure there is provided a method for managing UWB communication sessions, comprising the steps:
performing at first UWB communication session; wherein a process of a first UWB communication session is synchronized with a time base of a first UWB communication device; and
performing at least another UWB communication session, wherein a process of the at least another UWB communication session is synchronized to the first UWB communication session.

In this way a management with seamless executions of UWB communication sessions is provided, thus advantageously increasing user experience. In particular, by means of the proposed method there can be avoided negative effects of clock drift issues when the UWB communication unit performing the proposed method has both controller/initiator and controlee/responder sessions executed at the same time. An effect is that the two sessions have no time drift which may lead to overlapping communication time slots, and consequently to a total comms fail. The proposed method implements a kind of time multiplex for UWB communication sessions. Moreover, all UWB communication sessions can stay synchronized, which can result in less electric power consumption of an electronic mobile device equipped with a UWB communication unit performing the proposed method.

According to a further aspect there is provided UWB communication unit comprising means to carry out the proposed method.

According to a further aspect there is provided a computer implemented method comprising executable instructions which, when executed by a UWB communication unit cause said UWB communication unit to carry out the proposed method.

According to an embodiment, the at least another UWB communication session is started with a specified offset to a start time of the first UWB communication session S1. A kind of time multiplex of UWB communication sessions is provided in this way.

According to a further embodiment, the first UWB communication session is carried out as a reference session wherein a process of at least one other UWB communication session is timed to the reference session.

According to a further embodiment, the first UWB communication session is created by an anchor of the first UWB device, wherein a further UWB communication session is created by a second UWB device, and wherein the second device takes part in both UWB communication sessions. The primary anchor is thus used a temporal reference for several UWB communication sessions.

According to a further embodiment, the UWB communication sessions are one of the following: DL-TDoA session, double sided two way ranging DS-TWR session, UL-TDoA session, One-Way-AoA measurement session, single sided SS-TWR session, Data Transfer session. Advantageously, the proposed method can be implemented with various kinds of UWB communication sessions.

According to a further embodiment, a beginning of the at least one other UWB communication session is specified by a start of the first UWB communication session with the first UWB communication device.

According to a further embodiment, total durations of at least two synchronized UWB communication sessions are repeated cyclically. In this way a cyclic operation of a UWB communication unit is supported which can result in improved operation stability of the UWB communication unit. In particular, there time drifts are eliminated due to a strict clock synchronicity of UWB communication sessions.

According to a further embodiment, the method is performed in addition or alternatively to a UWB communication session prioritization scheme being applied to the UWB communication sessions. In this way, different methods with the aim of improving operating characteristics of an UWB communication system are provided.

According to a further embodiment, the method is carried out in a case that the session prioritization scheme for the UWB communication sessions fails to work. In this way, an alternative method for managing UWB communication sessions is provided, which supports a reliability of a UWB communication system.

BRIEF DESCRIPTION OF DRAWINGS

The aspects defined above and further aspects of the present disclosure are apparent from the examples of embodiment to be described hereinafter with reference to the appended drawings, which are explained with reference to the examples of embodiment. However, the disclosure is not limited to the examples of embodiment.

All illustrations in the drawings are schematical. It is noted, that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

DESCRIPTION OF EMBODIMENTS

As mentioned above, UWB is a technology that uses a high signal bandwidth, in particular for transmitting digital data over a wide spectrum of frequency bands with very low power. For example, UWB technology may use the frequency spectrum of 3.1 GHz to 10.6 GHz and may feature a high-frequency bandwidth of more than 500 MHz and very short pulse signals, resulting in high data rates. The UWB technology enables a high data throughput for communication devices and a high precision for a localization of devices.

Accordingly, UWB technology may be used to measure the distance between a UWB communication device whose position should be tracked (for example, a mobile device that functions as a key for accessing a vehicle or opening a door) and one or more UWB communication devices which are used to track said position (for example, UWB anchors embedded in a vehicle or a door). Typically, distance measurements are performed during UWB communication sessions referred to as ranging sessions. A typical UWB-based ranging session includes one or more messages (i.e. frames that are part of a distance estimation sequence) transmitted from a UWB communication device (which may also be referred to as a "reader") to one or more other UWB communication devices, as well as one or more messages in response to those frames, which are transmitted back to the communication device by the other communication device. It is noted that, depending on the role assigned to the communication device and the other communication devices in this message exchange, either the communication device may act as an "initiator" or "controller" (in which case the other communication devices act as "responders" or "controlees") or the communication device may act as a "responder" or "controlee" (in which case the other communication devices act as "initiators" or "controllers").

Accordingly, an important application of UWB is to perform accurate distance measurements. Since modern location-aware devices should support multiple applications at the same time, also multiple distance measurement sessions (i.e. ranging sessions) should be supported at the same time. Implementing a scheduler is a common way of managing the execution of multiple ranging sessions. For instance, a typical scheduler has a task (e.g. a distance measurement session) and its priority as input.

Figure 1:
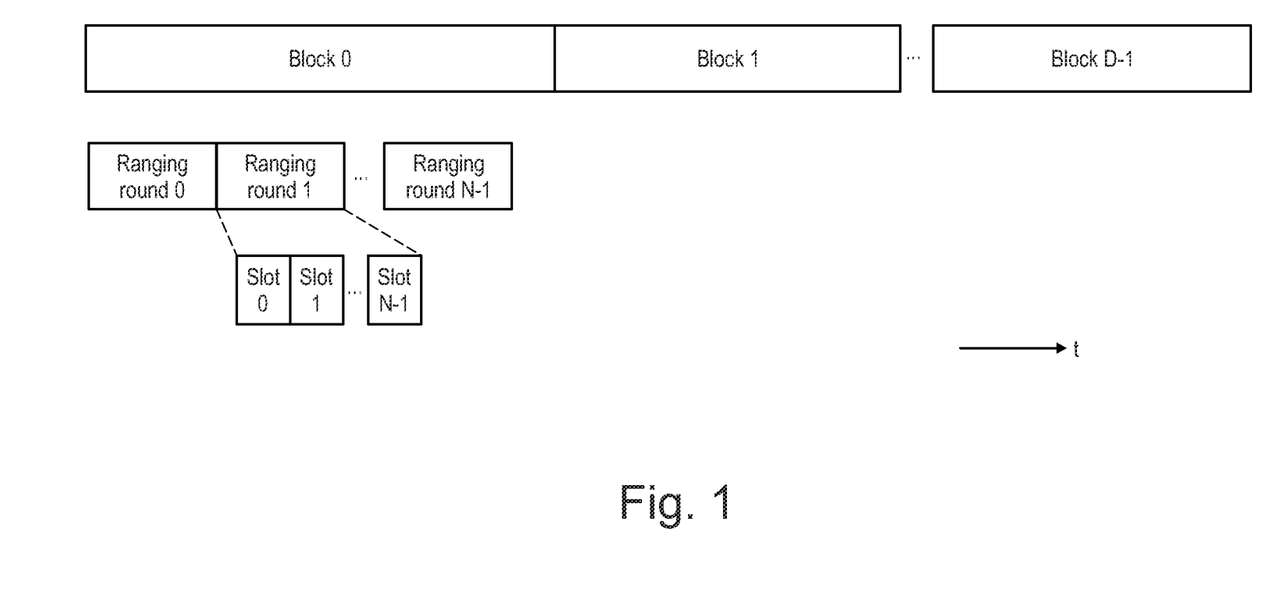
FIG. 1 shows a principle structure of UWB messages.

FIG. 1 shows an overview of a UWB message structure along a time axis. One recognizes several blocks 0 . . . D−1, wherein each block is divided in time into so called "ranging rounds" 0 . . . N−1, wherein every ranging round is divided in time into several slots 0 . . . N−1. As a result, each ranging round comprises N slots which are strictly aligned to the timing of the ranging round.

Figure 2:
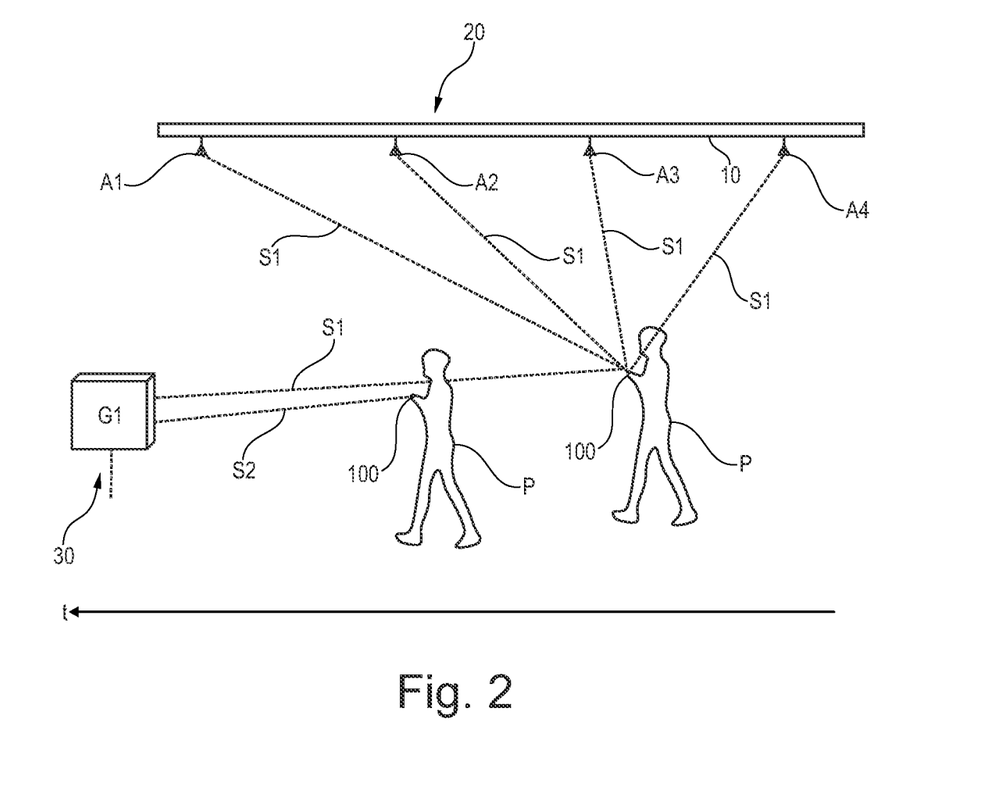
FIG. 2 shows a scenario with a UWB communication system.

FIG. 2 shows an exemplary scenario (e.g. transit station of a public transport) for an implementation of the proposed method. One recognizes a user P walking in the scenario with his UWB enabled mobile device 100 in his hand. The user P uses his UWB enabled mobile device 100 to trigger a UWB enabled navigation application. To this end, a first UWB communication session S1 is performed between the UWB enabled mobile device 100 and a first communication device 20 comprising several anchors A1 . . . A4 mounted on a ceiling 10 of an infrastructure. A second UWB communication session S2 is performed between the UWB enabled mobile device 100 and a second communication device 30 comprising at least one gate G1 with an anchor (not shown). The user P is navigated by means of the first UWB communication session S1 represented as a UWB DL-TDoA session (Downlink Time Difference of Arrival) in order to find the gate G1 of the second communication device 30 and to perform a fare transaction between the UWB enabled mobile device 100 in an interaction with the gate G1.

In other words, the first UWB communication session S1 performs a location procedure (Indoor-GPS) between the anchors A1 . . . An of the first communication device 20 and the UWB enabled mobile device 100 being equipped with a UWB communication unit (not shown). The second UWB communication session S2 performs distance measurements between the at least one gate G1 of the second communication device 30 and the UWB enabled mobile device 100. For example, the UWB enabled mobile device 100 can be NFC enabled and can thus automatically perform a fare transaction with the gate G1 without a need to bring the UWB enabled mobile device 100 in contact with the gate G1. A pass of the gate G1 of the second communication device 30 suffices to perform the fare transaction. A user time line indicates that the sessions S1, S2 between the gate G1 and the UWB enabled mobile device 100 are started at different times.

As a result, at the same time there are performed a localization session and distance measurements between the anchor of the gate G1 of the second UWB communication device and the UWB enabled mobile device 100. The UWB communication sessions S1, S2 are depicted in FIG. 2, which are carried out while the user P moves within the scenario over time t.

Most of the time, the second UWB communication session S2 is a so called "hybrid session", which means that in relation to the gate G1 there are carried out two parts of the second UWB communication session S2. A first part (content access period, contention based ranging) performs an invitation to all devices in the environment of the gate G1 to take part at the second UWB communication session S2, which means that the UWB enabled mobile device 100 is invited to answer. If the UWB enabled mobile device 100 has approached sufficiently to the gate G1, the UWB enabled mobile device 100 is invited to answer. The UWB enabled mobile device 100 then accepts the invitation and communicates with the gate G1. The second part of the second UWB communication session S2 is the transaction between the gate G1 and the UWB enabled mobile device 100.

Conventionally, after a certain amounts of blocks, the start of the second UWB communication session S2 will shift into the N−1 slot, which could result in collisions. When the gate G1 starts its own session, it takes its own clock as a reference timer. Albeit the clocks of the anchor A1 of the first UWB communication device 20 and the clock of G1 of the second UWB communication device 30 are very precise, they most likely drift apart after a certain time.

If the UWB communication sessions S1, S2 collide and want to trigger an action (e.g. a ranging operation) at the same time only the action (e.g. ranging operation) of one UWB communication session can be executed. In the present example, depending on the session priority, one of the two UWB communication sessions S1, S2 will be scheduled more often than the other one. Since every UWB communication device 20, 30 has a corresponding UWB session priority, the priority parameter can be used as a decision criterion for scheduling a ranging with one UWB communication device 20, 30 more often than with the other UWB communication device 20, 30.

For example, if the first UWB communication device 20 has a higher priority than the second UWB communication device 30, the first UWB communication device 20 will be scheduled more often, which leads to a better user experience if somebody approaches the second first UWB communication device 20 with his UWB enabled mobile device 100.

However, this can result in a worse user experience if somebody approaches the second UWB communication device 30, because this communication device is scheduled less often because of its lower priority.

As the user P approaches the second UWB communication device 30 with at least one gate G1, a second UWB communication session S2 formed as a UWB based SS-TWR ranging session (Single Sided Two Way Ranging) starts. A first UWB communication session S1 is performing DL-TDOA ranging between the UWB enabled mobile device 100 and anchors A1 . . . An and a second UWB communication session S2 is performing SS-TWR ranging between the UWB enabled mobile device 100 and the second UWB communication device 30.

In an alternative scenario (not shown in figures), a first UWB communication session S1 could be a session with a physical access to a door and a second UWB communication session S2 running at the same time could be a car access ranging session, both UWB communication sessions S1, S2 being performed by means of the UWB communication unit of the UWB enabled electronic mobile device 100.

Figure 3:
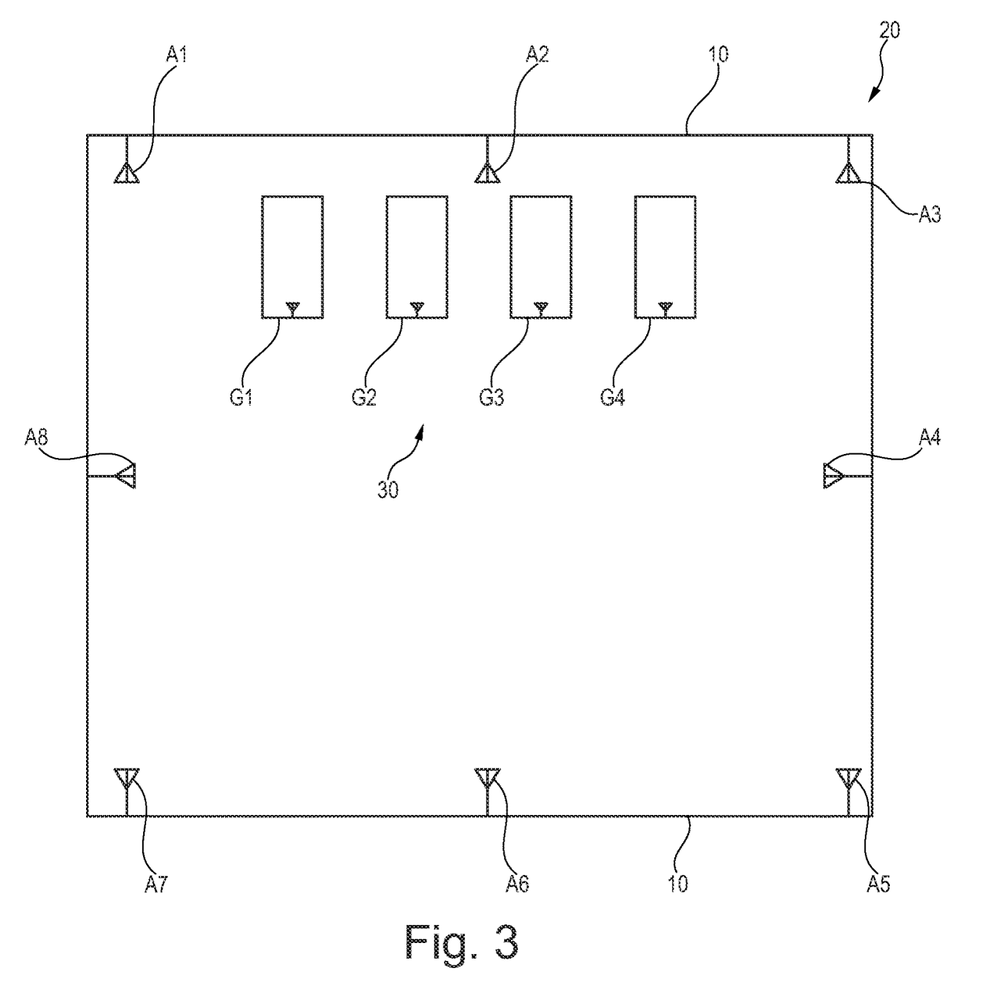
FIG. 3 shows a principle floor plan of the scenario of FIG. 2.

A possible floor plan of the scenario of FIG. 2 station is shown in FIG. 3. One recognizes anchors A1 . . . A8 of the first UWB communication device 20 being mounted on the ceiling 10. Furthermore, the gates G1 . . . G4 represent UWB units of the second UWB communication device 30 comprising one internal anchor each (not shown).

Figure 4:
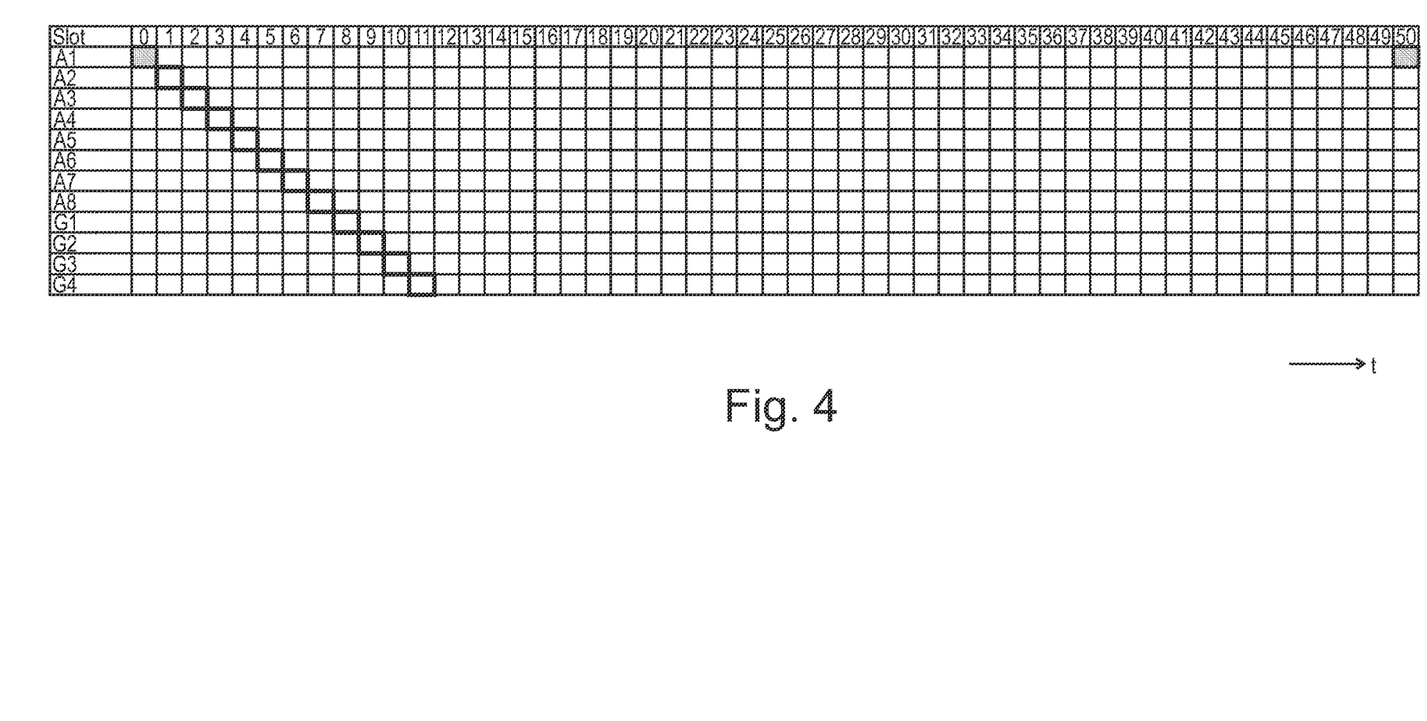
FIG. 4 shows a conventional timing diagram of a single UWB communication session.

FIG. 4 shows a timing diagram with a first UWB communication session S1 carried out between the UWB enabled mobile device 100 and the anchors A1 . . . A8 of the first UWB communication device 20 and the anchors of the gates G1 . . . G4 of the second UWB communication device 30. One recognizes communications between the second anchor A2 and the UWB enabled mobile device 100 in time slot 1, a communication between the third anchor A3 and the UWB enabled mobile device 100 in time slot 2, and so on.

Figure 5:
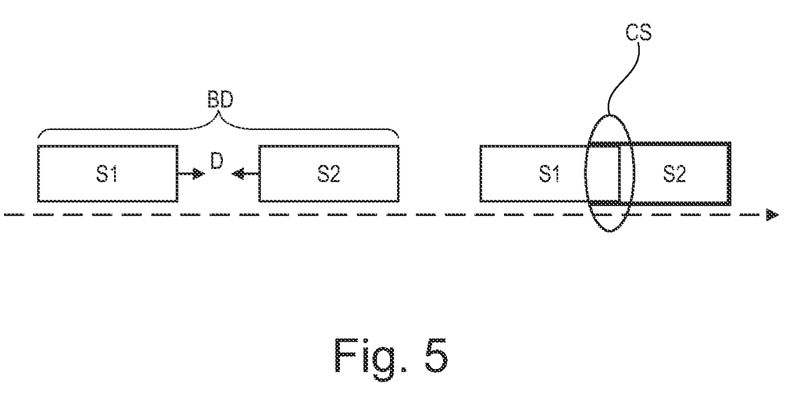
FIG. 5 shows a conventional timing diagram of two running UWB communication sessions.

FIG. 5 shows a timing diagram with two UWB communication sessions S1, S2. One recognizes, that both sessions S1, S2 are drifting towards each other (e.g. due to clock drifts of the anchors of the first and second UWB communication devices 20, 30), which is depicted as drift D. The drift D can be positive (increasing a temporal distance of the UWB communication sessions S1, S2, not shown) and can also be negative (reducing a temporal distance of the UWB communication sessions S1, S2 as shown in FIG. 5). Both scenarios are shown in FIG. 5, wherein the second scenario results in a collision CS of both UWB communication sessions S1, S2.

FIG. 5 depicts a consequence of a clock drift between the anchor of the gate G1 and the primary anchor A1. In the first UWB communication session S1 the second UWB communication device 30 is in a controlee role and in the second UWB communication session S2, the gate G1 runs its own session in controller role. Thus, in the first UWB communication session S1 the timing is defined by the remote device (e.g., the anchors A1 . . . An, where one of them is the reference anchor) and the gate G1 has to stick to it. For the second UWB communication session S2 each gate is using its device internal clock source. Even if both are very accurate (e.g. <00 ppm) after e.g. 10 s the drift is significant and may result in collisions.

For the transport case the UWB enabled mobile device 100 is always in controlee role, wherein the gates are affected by the time drift. It is no longer possible to receive messages sent from the second UWB communication device 30 due to collision of UWB communication sessions, the user P is not able to receive messages from the second communication device 30 and, as a consequence, to respond to said messages with his UWB enabled mobile device 100. In other words, the user P is not able to align to the messages coming from the second UWB communication device 30. As a consequence, distance measurements performed by the second UWB communication session S2 will fail, albeit the ranging process of the first UWB communication session S1 still works.

Such internal collisions can lead to missing synchronization over RF (controlee losing track of a message from the controller). Therefore, when a multiple mix of UWB communication sessions S1 . . . Sn are executed for a specific time, assume a block duration of 100 ms, and a slot length of 1 ms. Given a worst-case clock accuracy of +/−100 ppm. Assuming a 100 ppm clock drift between the primary anchor A1 of the first UWB communication device 20 and the anchor of the gate G1 of the second UWB communication device 30. After a session duration 10 s the drift between the two devices is already 1 ms, which is one slot duration.

There could be an overlap or collision of sessions, which can result in resynchronization processes.

The anchors A1 . . . An of the first UWB communication device 20 are running the first session S1 as controllers. The at least one gate G1 . . . Gn are participating in the first UWB communication session 1 as controlees. Gates each are running a SS-TWR session 2 as controller.

It is proposed to start the second UWB communication session S2 within the gate G1 with a specified time offset to the first UWB communication session S1 (which acts as a reference time session). As a result, clock drifts between the two UWB communication sessions S1, S2 do not have an adverse effect.

This can be implemented by means of a reference session concept on top or alternatively of the dynamic session prioritization scheme that uses the synchronization status of each UWB communication session S1, S2 as an input parameter for changing the session priority dynamically. If the session is unable to schedule due to drift errors, the reference session concept overcomes the clock drift issue.

Figure 6:
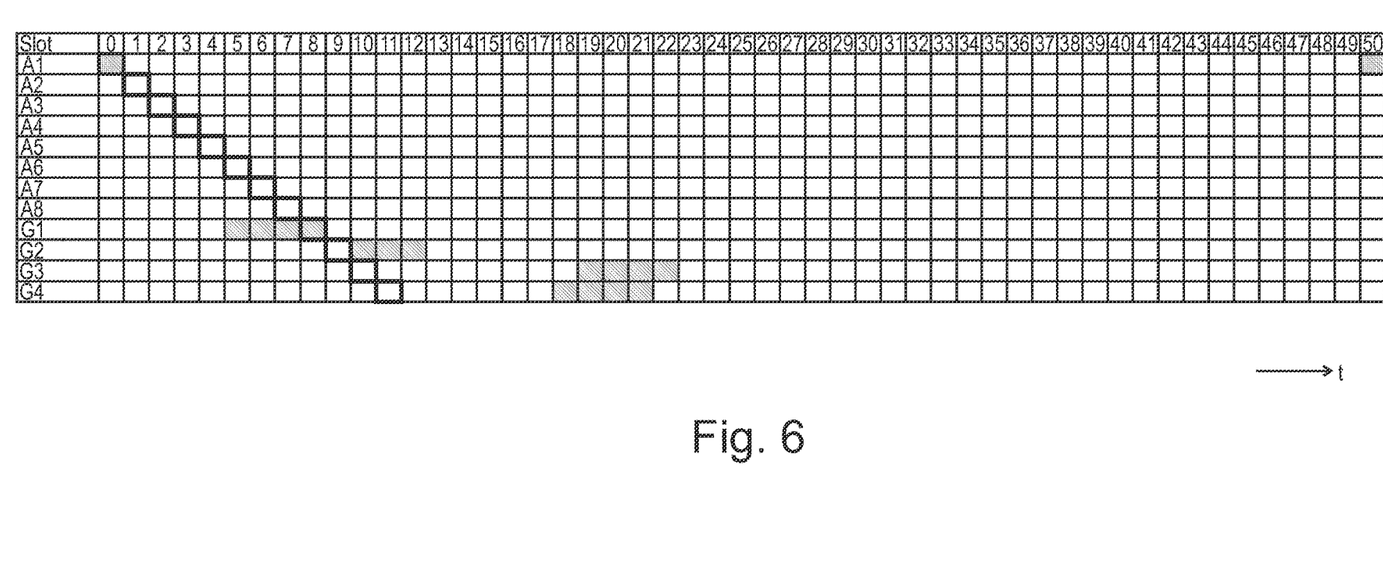
FIG. 6 shows a timing diagram of conventional UWB communication sessions.

FIG. 6 shows an effect of the collision mentioned in the context of FIG. 5. Due to the drift over time and the slots of the second UWB communication sessions S2 with the gates G1 . . . G4, the second UWB communication sessions S2 with the gates G1, G2 are overlapping with the first UWB communication session S1 with said gates G1, G2. In addition to the timing diagram of FIG. 5, FIG. 6 shows results of the mentioned clock drifts. Said overlapping can result in the above mentioned drawbacks of lost messages, resynchronization processes and increased electric power consumption. The shaded blocks are sessions of the gates G1 . . . G4 and represent independent second UWB communication sessions S2. The second UWB communication sessions S2 with the gates G1, G2 would be shifted forward and the second UWB communication sessions S2 with the gates G3, G4 would be shifted backwards and would collide with the new block of the first UWB communication session S1 at a certain point of time, indicated by the slot 50.

FIG. 6 shows a time schedule wherein the primary anchor A1 transmits in slot 0 and all the secondary anchors A2 . . . A8 of the first communication device 20 listen to it in order to synchronize their time grid. In subsequent slots every anchor A2 . . . A8 sends its ping. In addition to the DL-TDoA session, the four gates G1 . . . G4 of the second communication device 30 perform the controller hybrid session running, which could follow the time grid as shown in FIG. 5.

Under the assumption that no clock drift corrections are done after several rounds the time schedule looks like as depicted in FIG. 6. The first UWB communication session S1 sessions remain "stable", because they have a common time base provided by the primary anchor A1 of the first UWB communication device 20. As a consequence, they all follow the clock of the primary anchor A1. However, the second UWB communication sessions S2 are drifting as mentioned above. In the shown example, the second UWB communication session S2 with gate G1 has temporally drifted to the left and already overlaps with the first UWB communication session S1. Furthermore, also the second UWB communication session S2 with gate G2 has drifted to the left. Moreover, the second UWB communication session S2 of gate G3 has drifted to the right overlapping with the first UWB communication session of gate G4 of the second UWB communication device 30.

The mentioned drifts are a consequence of multiple different clock sources of the UWB communication sessions S1, S2. While the first UWB communication sessions S1 are nicely synchronized to the primary anchor A1, the remaining sessions are completely de-correlated.

Figure 7:
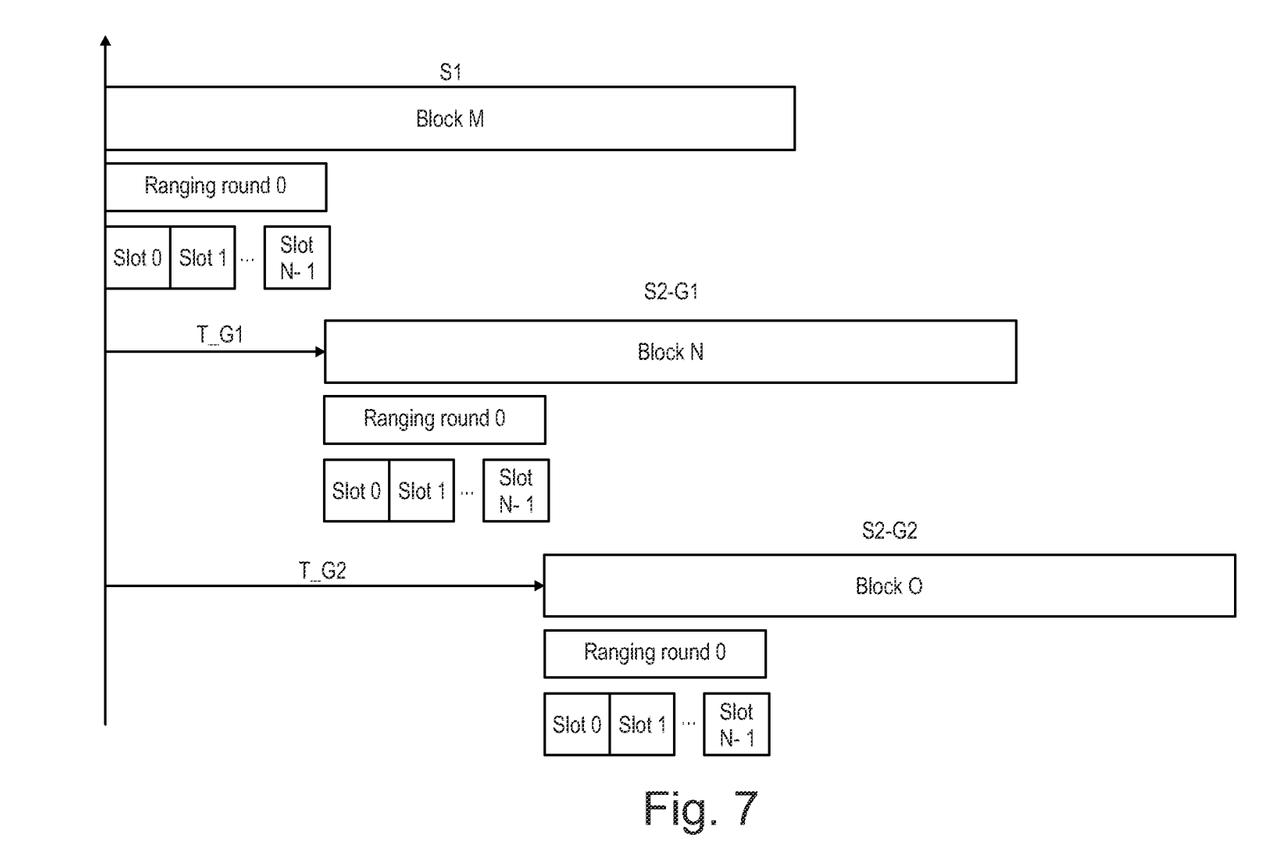
FIG. 7 and FIG. 8 show timing diagrams of UWB communication sessions using the proposed method.

FIG. 7 shows an overview of managed UWB communication sessions using the proposed method. One recognizes that the first UWB communication session S1 acts as a reference session. Now, the gates G1 . . . Gn can schedule their second UWB communication sessions S2 at temporal offsets to reduce collisions in the station.

Assuming a station with DL-TDoA deployment, there will be one primary anchor A1 of the first UWB communication device 20 and all the other anchors A2 . . . A8 represent secondary anchors. The primary DL-TDoA anchor is represented by the primary anchor A1, the remaining anchors A2 . . . A8 are the secondary DL-TDoA anchors. In addition, the four anchors G1 . . . G4 of the second UWB communication device 30 mounted on the gates G1 . . . G4 will participate in this session as responder. Each gate G1 . . . G4 is running its own second UWB communication session S2 in parallel in controller role, starting each with a time offset T_G1, T_G2, T_G3, T_G4, etc. with respect to the start of the ranging round of the first UWB communication session S1.

The second UWB communication session S2 between the gate G1 and the UWB enabled mobile 100 starts with an offset T_G1 to the first UWB communication session S1 between the primary anchor A1 and the UWB enabled mobile device 100. The second UWB communication session S2 between the gate G2 and the UWB enabled mobile 100 starts with an offset T_G2 to the first UWB communication session S1 between the primary anchor A1 and the UWB enabled mobile device 100. In this way, the primary anchor A1 acts as a common time base for time synchronization of the first and second UWB communication sessions S1, S2.

The proposed method provides, in the context of UWB, to participate at a UWB communication session and to start an own UWB communication session in relation to a reference session. The proposed method manages UWB communication sessions which are aligned to one common time base (reference time, primary anchor A1). The proposed method can be performed on top of a session prioritization scheme as having been mentioned above, which means that firstly by means of a prioritization scheme a reference session is selected. If said prioritization scheme is unable to schedule due to drift errors, then the proposed method overcomes the clock drift issue. Advantageously, in this way a two-step concept can be realized with the following two steps:
  1. Prioritization of UWB communication sessions
  2. Performing of reference sessions with synchronization to a single master clock The proposed method hence implements a "reference session for session schedule" which can help to solve this problem by announcing a second session as a "reference session for sessions schedule", wherein the second UWB communication sessions S2 will follow the time grid of the first UWB communication session S1 (reference session). In the present scenario this means that the reference session is represented by the first UWB communication session S1, formed e.g. as DL-TDoA session. By doing that, all UWB communication sessions are automatically synchronized to the clock of the primary anchor A1. In this way, because the master anchor A1 represents the reference clock for all other DL-TDoA anchors and because the second UWB communication sessions S2 use the DL-TDoA session of their anchor as reference, they indirectly use the primary anchor A1 as their reference.

Figure 8:
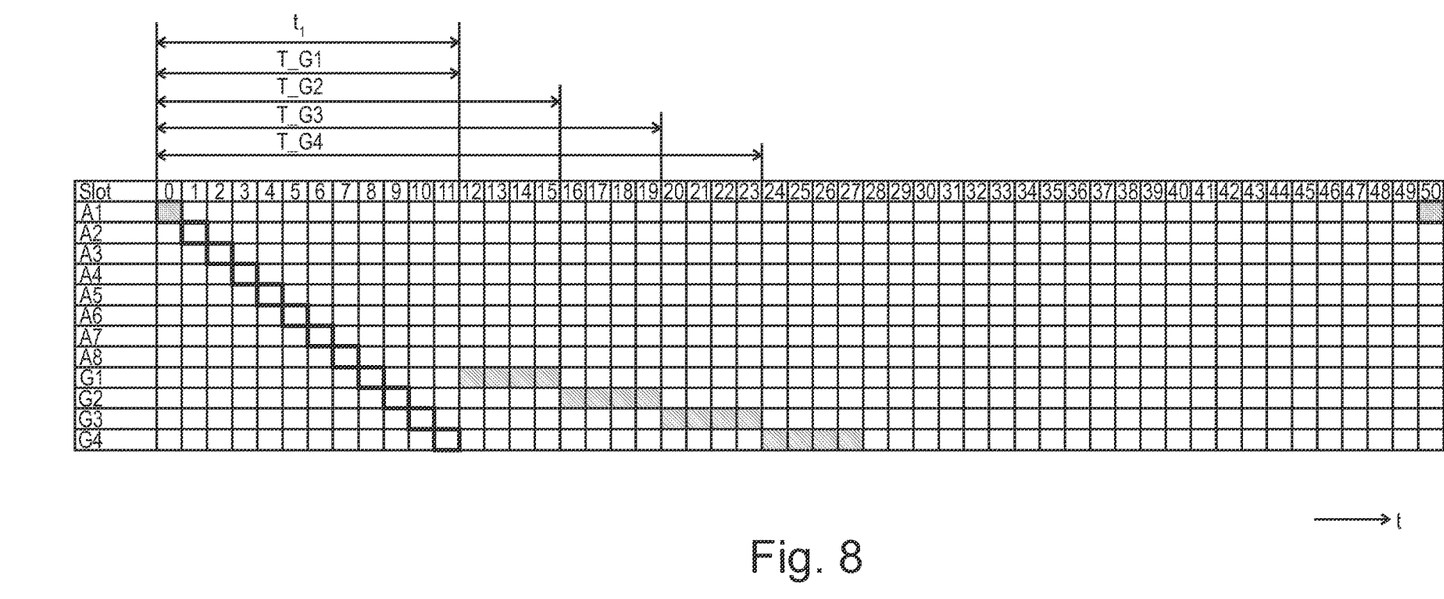

The explained circumstances are shown in the time schedule of FIG. 8. One recognizes that the second UWB communication session S2 only start when the ranging rounds for the first UWB communication sessions S1 have been completely terminated.

t1 represents the entire active communication time for the first UWB communication session S1, where all anchors A1 . . . An and gates are participating as DL-TDOA anchors. The gate G1 starts its own second UWB communication session S2 with a delay of T_G1 after the start of the DL-TDOA ranging round (start of slot 0).

One recognizes, that gate G2 starts its own second UWB communication session S2 with a delay of T_G2 after the start of the DL-TDOA ranging round.

Moreover, one recognizes, that gate G3 starts its own second UWB communication session S2 with a delay of T_G3 after the start of the DL-TDOA ranging round.

Moreover, one recognizes, that gate G4 starts its own second UWB communication session S2 with a delay of T_G4 after the start of the DL-TDOA ranging round.

Afterwards every cycle is kept repeated, wherein a complete cycle includes slots 1 to slot 49. Starting with slot 50 as a new primary anchor slot, the slots can be repeated cyclically (not shown in Figures). Slots 50 to 99 represent a second complete block duration, slots 100 to 149 represent a third complete block duration, and so on (not shown in Figures). That means in the exemplary scenario, that each block duration is 50 time slots apart from the next block duration. The reference session is synchronized to primary anchor A1 of the first communication device 20. The second UWB communication sessions S2 of each gate G1 . . . Gn are aligned with the reference session formed as the first UWB communication S1. This is achieved by using the primary anchor A1 of the first communication device 20 as a temporal reference unit.

Though not shown in figures, a beginning of the second UWB communication session S2 can be even later with a defined offset to the start of the first UWB communication session S1. In other words, the shown timing diagram shows a start of the second UWB communication sessions S2 of each gate G1 . . . Gn at the earliest possible time, wherein also later times are possible.

Advantageously, by eliminating worse effects of drifts, re-synchronizations are not necessary which contributes to an energy-saving operation of a UWB enabled mobile device 100 being equipped with the UWB communication unit 40.

In the use case of the described scenario, the proposed method has been described with respect to the UWB communication units of the gates G1 . . . Gn of the second UWB communication device 30 because only those gates G1 . . . Gn performs two UWB communication sessions.

FIG. 8 shows that the sessions of the gate now maintain a constant time offset which results in no slot overlaps for communication. With implementation of the proposed method, the gate G1 "listens" to the primary anchor A1 and starts its own second UWB communication sessions S2 with a specified temporal reference to the signal of primary anchor A1.

Figure 9:
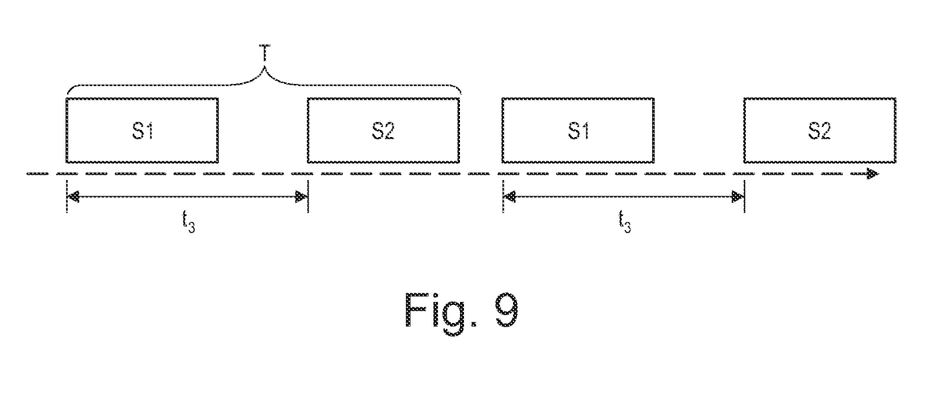
FIG. 9 shows a timing diagram of two UWB communication sessions using the proposed method.

FIG. 9 shows a time schedule as a result of the proposed method. One recognizes, that there are no collisions between the first and second UWB communication sessions S1, S2. Hence, resynchronization processes of the gates G1 . . . Gn with anchors A1 . . . An of the first UWB communication device 20 are not necessary.

Figure 10:
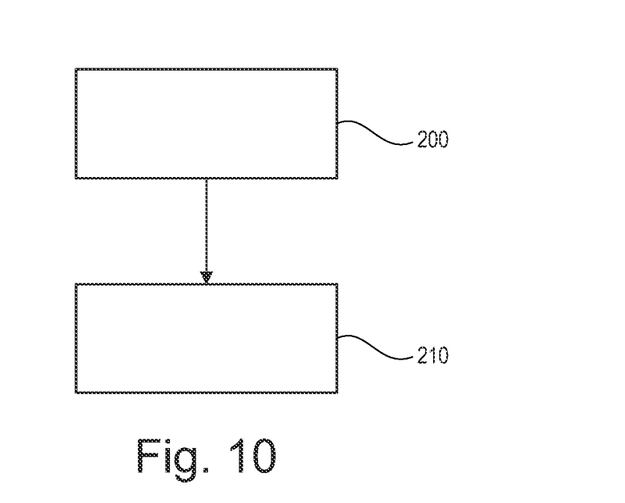
FIG. 10 shows a principal flow of the proposed method.

FIG. 10 shows in principal a flow of the proposed method.

In a step 200 there is performed a first UWB communication session S1 . . . Sn, wherein a process of a first UWB communication session S1 . . . Sn is synchronized with a time base of a first UWB communication device 20.

In step 210 there is performed at least another UWB communication session S1 . . . Sn, wherein a process of the at least another UWB communication session S1 . . . Sn is synchronized to the first UWB communication session S1 . . . Sn.

Needless to say, that numbers and natures of UWB communication sessions mentioned in the context of the present disclosure are merely exemplary. This means that the UWB communication sessions can be used in any number to perform e.g. all kinds of ranging, data transfer, localization, etc. The UWB communication sessions in the context of the present disclosure can be at least one of the following: DL-TDoA session, double sided two way ranging DS-TWR session, UL-TDoA session, One-Way-AoA measurement session, single sided SS-TWR session, Data Transfer session, etc.

The proposed method can be implemented at least partially as a software which can be stored in a computer readable memory or at least partially as a firmware or at least partially as a hardware (e.g. a UWB radar chip). The chip does mainly the distance measurements (Time-of-Flight measurements), wherein a host configures details which of the diverse UWB sessions should act as the primary session.

Figure 11:
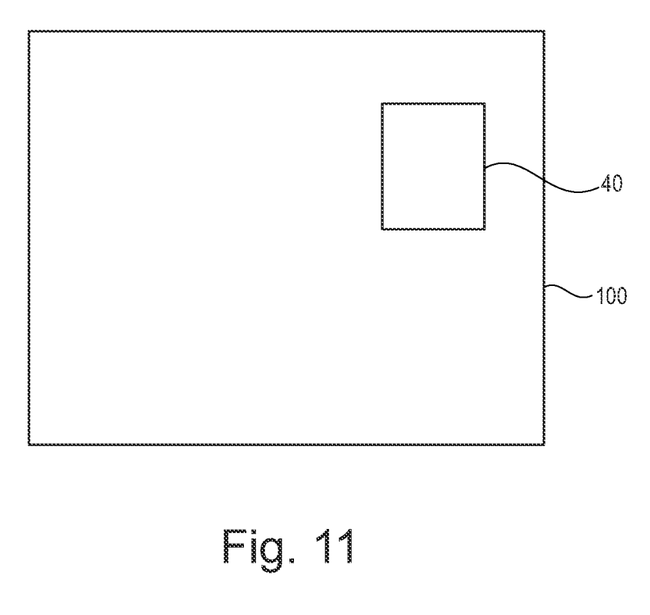
FIG. 11 shows a block diagram of a UWB enabled communication device.

FIG. 11 shows a block diagram of a UWB enabled communication device. One recognizes a UWB communication unit 40 which is an element of a UWB enabled mobile device 100 (e.g. mobile phone, smartphone, tablet, etc.).

Hereinbefore, spatially relative terms, such as "front" and "back", "above" and "below", "left" and "right", et cetera are used to describe an element's relationship to another element(s) as illustrated in the figures. Thus, the spatially relative terms may apply to orientations in use which differ from the orientation depicted in the figures. Obviously all such spatially relative terms refer to the orientation shown in the figures only for ease of description and are not necessarily limiting as an apparatus according to an embodiment can assume orientations different than those illustrated in the figures when in use.

Additionally unless expressly stated to the contrary, the terms "first", "second", "third", etc. are intended to distinguish the particular nouns that modify (e.g. session, device, element, unit, condition, node, module, activity, session, step, operation, etc.). Unless expressly stated to the contrary, the use of these terms is not intended to indicate any type of order, rank, importance, temporal sequence, or hierarchy of the modified noun. For example, "first X" and "second X" are intended to designate two "X" elements that are not necessarily limited by any order, rank, importance, temporal sequence, or hierarchy of the two elements. Furthermore, as referred to herein, "at least one of" and "one or more of" can be represented using the "(s)" nomenclature (e.g. one or more element(s)).

Moreover, it should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Moreover, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

It has to be noted that embodiments have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this application.

The disclosure or embodiments of the disclosure described above can be descriptively summarized as follows: an operation method, in particular a synchronization concept for a UWB communication device, which can provide improved operation characteristics, e.g. reduced electric power consumption due to reduce resynchronization processes.

REFERENCE NUMERALS 10 ceiling
20 first UWB communication device
30 second UWB communication device
40 UWB communication unit
100 UWB enabled electronic mobile device
A1 . . . An anchors
BD block duration
CS collision of sessions
D drift
G1 . . . Gn gates
P Person
S1 . . . Sn UWB communication sessions
t time
T_G1 . . . T_Gn offsets
200, 210 method steps

We claim:

1. A method for operating a UWB communication unit comprising the steps:
   selecting a prioritization scheme to apply to subsequent UWB communication sessions; and
   implementing the following steps if the selected prioritization scheme fails:
      performing a first UWB communication session comprising synchronizing a process of the first UWB communication session with a time base of a first UWB communication device; and
      performing a second UWB communication session comprising synchronizing, a process of the second UWB communication session to the first UWB communication session.

2. The method of claim 1, wherein performing the second UWB communication session further comprises starting the session with a specified offset to a start time of the first UWB communication session.

3. The method of claim 2, wherein performing the second UWB communication session further comprises specifying a beginning of the second UWB communication session according to a start of the first UWB communication session with the first UWB communication device.

4. The method of claim 1, wherein the first UWB communication session is carried out as a reference session and wherein a process of the second UWB communication session is timed to the reference session.

5. The method of claim 1, further comprising:
   creating the first UWB communication session with an anchor of the first UWB communication device;
   creating a third UWB communication session with a second UWB device; and
   utilizing the second UWB communication device in the first and third UWB communication sessions.

6. The method of claim 1, wherein the UWB communication sessions are one of the following: a downlink time difference of arrival (DL-TDoA) session, double sided two way ranging (DS-TWR) session, uplink time difference of arrival (UL-TDoA) session, One-Way-AoA measurement session, single sided two way ranging (SS-TWR) session, and Data Transfer session.

7. The method of claim 1, further comprising repeating at least two synchronized UWB communication sessions cyclically for a total duration.

8. The method of claim 1, wherein at least one of the UWB communication sessions is performed between a UWB communication unit and a UWB anchor of a localizing system.

9. The method of claim 1, wherein at least one of the UWB communication sessions is performed between a UWB communication unit and a UWB anchor of a fare terminal.

10. The method of claim 1, wherein at least one of the UWB communication sessions is performed between an UWB communication unit and a UWB anchor of a car.

11. A computer implemented method comprising executable instructions stored in a computer readable non-transient medium, which when executed by a UWB communication unit cause said the UWB communication unit to:
   perform a first UWB communication session comprising synchronizing a process of the first UWB communication session with a time base of a first UWB communication device; and
   perform a second UWB communication session comprising:
      synchronizing a process of the second UWB communication session to the first UWB communication session; and
      specifying a beginning of the second UWB communication session according to a start time of the first UWB communication session with the first UWB communication device.

12. The computer implemented method of claim 11, wherein the computer readable non-transient medium further comprises hardware of the UWB communication unit.

13. An electronic communication device comprising:
   a UWB communication unit configured to:
   select a prioritization scheme to apply to subsequent UWB communication sessions; and
   implement the following steps if the selected prioritization scheme fails:
      perform a first UWB communication session comprising synchronizing a process of the first UWB communication session is with a time base of a first UWB communication device, and
      perform a second UWB communication session comprising synchronizing a process of the second UWB communication session to the first UWB communication session.

14. The electronic communication device of claim 13, wherein the electronic communication device is at least one of: a smartphone, a key, and a tablet.

* * * * *